April 29, 1930.  H. T. AHRENS ET AL  1,756,475
COTTON GIN
Filed March 28, 1929  3 Sheets-Sheet 1
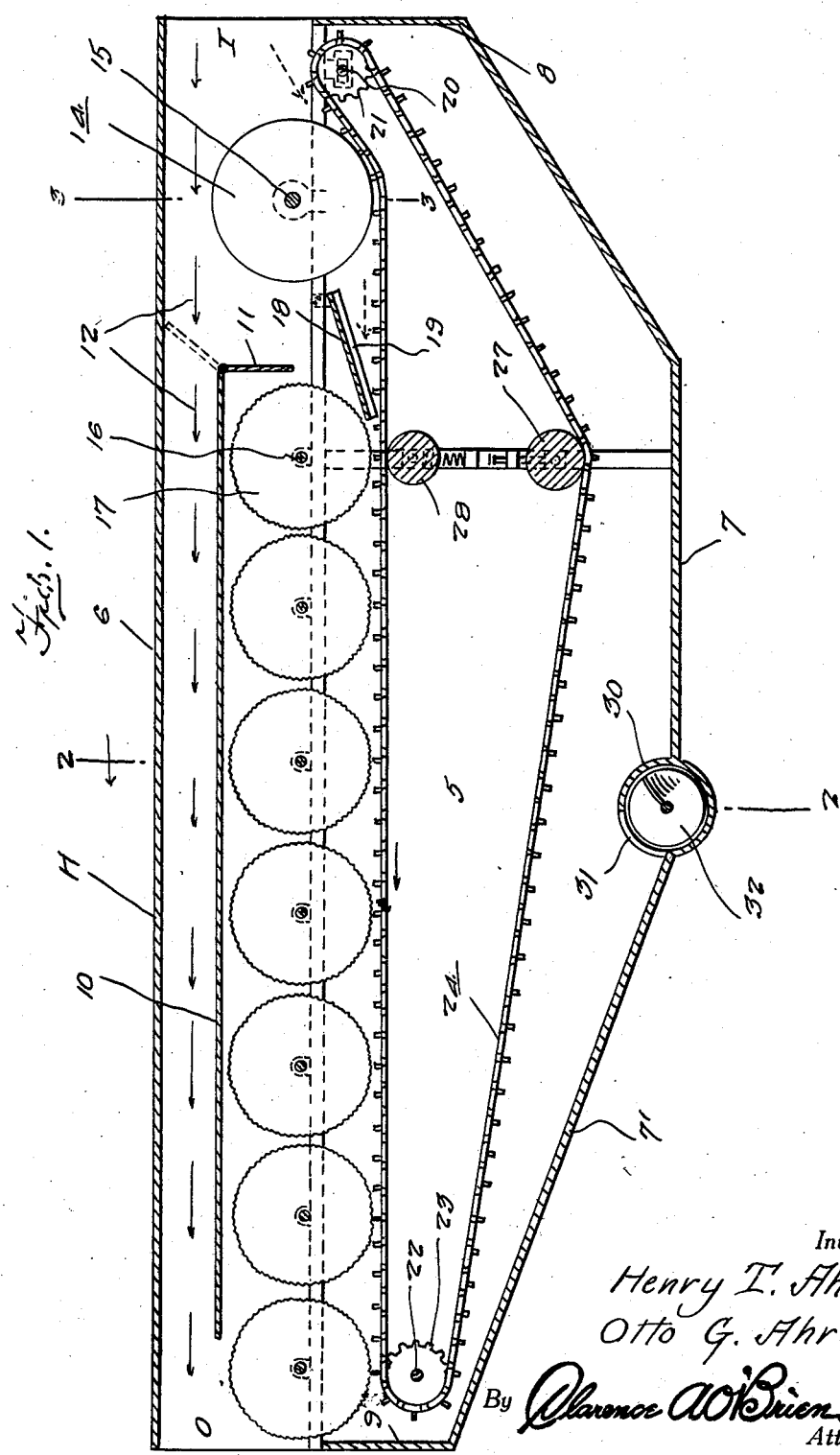
Inventors
Henry T. Ahrens
Otto G. Ahrens
By Clarence A. O'Brien
Attorney

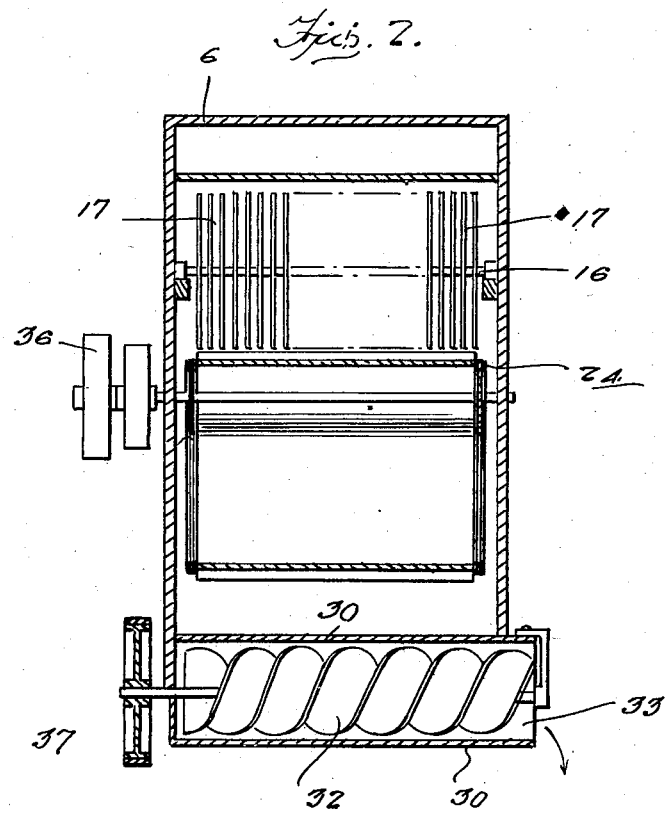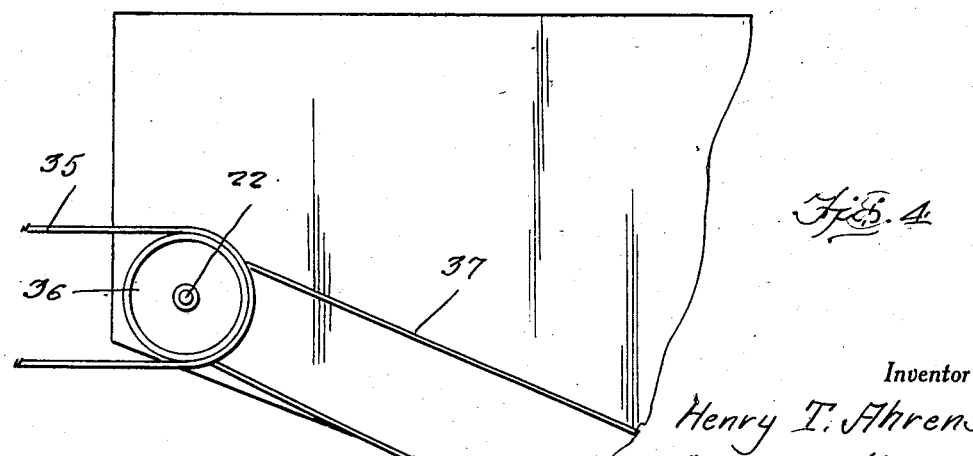

April 29, 1930.  H. T. AHRENS ET AL  1,756,475
COTTON GIN
Filed March 28, 1929   3 Sheets-Sheet 3
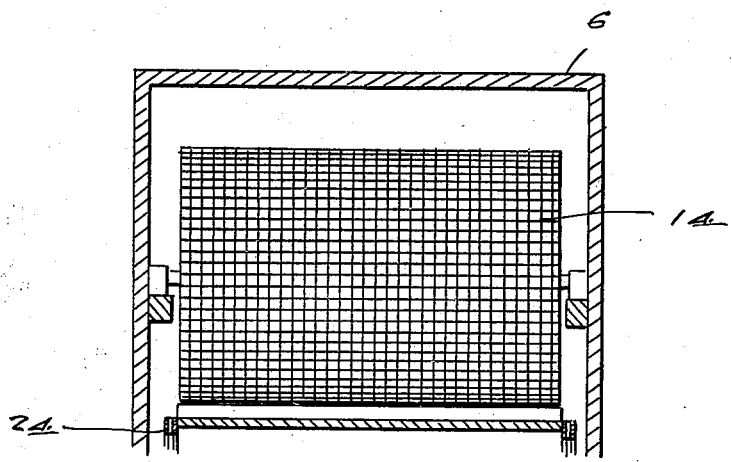
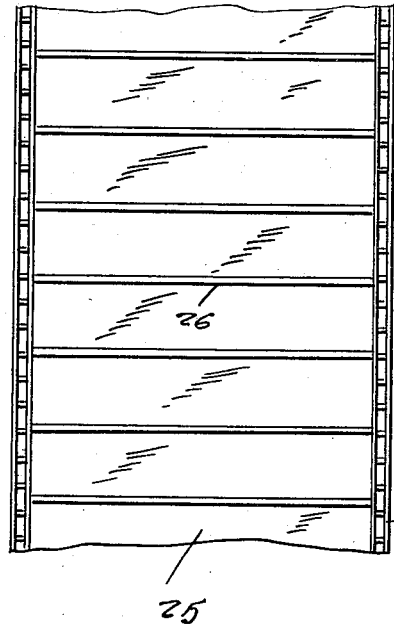
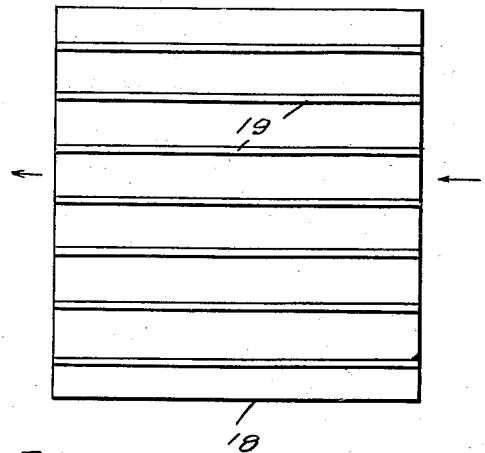
Inventors
Henry T. Ahrens
Otto G. Ahrens
By Clarence A. O'Brien
Attorney

UNITED STATES PATENT OFFICE

HENRY T. AHRENS, OF CHARLOTTE, AND OTTO G. AHRENS, OF STOCKDALE, TEXAS

COTTON GIN

Application filed March 28, 1929. Serial No. 350,660.

The present invention relates to a cotton gin for the purpose of cleaning bolly, dirty or snap cotton and is operated upon the suction principle which is used in bringing the cotton from the wagon to the gin stand.

An important object resides in the provision of a structure which is simple, convenient in its arrangement of parts, thoroughly efficient and reliable in its operation and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a vertical longitudinal section through the machine embodying the features of our invention, Figure 2 is a vertical transverse section therethrough taken substantially on the line 2—2 of Figure 1, Figure 3 is a detail vertical section taken substantially on the line 3—3 of Figure 1, Figure 4 is a fragmentary side elevation of one end of the machine, Figure 5 is a plan view of the belt, and Figure 6 is a bottom plan view of the separator.

Referring to the drawing in detail it will be seen that the letter H denotes an elongated housing consisting of side walls 5, a top 6, a bottom 7, and end walls 8 and 9 rising from the ends of the bottom 7 and terminating a distance below the top to provide an inlet I and an outlet O.

A horizontal partition 10 is disposed between the side walls 5 a distance below the top and in parallelism therewith and terminates a distance from the entrance and the outlet respectively. A damper 11 is pivotally mounted on the inlet end of the partition for regulating the draft therethrough indicated by arrows 12. A screen separator cylinder 14 is mounted on a shaft 15 extending between the sides 5 and is located immediately adjacent the inlet I.

A plurality of shafts 16 are disposed between the side walls 5 under the partition 10 and on each shaft 16 is a gang of disk saws 17. A separate plate 18 extends downwardly and rearwardly and has longitudinally extending ribs 19 on the under surface thereof. A shaft 20 is mounted immediately below the inlet eye and has sprockets 21 thereon. A shaft 22 is located below the series of saws 17 adjacent the outlet O and has a sprocket 23 thereon.

Chains 24 are trained over the sprocket 23 and have a belt 25 therebetween with transverse cleats 26 spaced at regular intervals. The belt is trained under the cylinder 14. A tension roll 27 is mounted between the sides 5 to engage the lower run of the belt. A spring pressed tension roll 28 is disposed between the sides to engage the upper run of the belt immediately under the first gang of saws 17.

A portion 7' of the bottom 7 inclines downwardly and forwardly from the end wall 9 and merges into a cylinder 30 having an entrance slot 31 so that hulls rolling down the inclined slide and through slots 31 to enter the cylinder 30 and are conveyed to one side by an auger 32 journaled in the cylinder, one end of the cylinder being open to form an outlet 33 as is clearly shown in Figure 2.

The belt carries the cotton under the saws and the cleats knock the hulls off the saws. After the belt carries the hulls or bolls so that they drop on the slide 7', these are carried to the cylinder 30 by gravitation and enter the cylinder through the slot 31. The cotton is blown through the outlet O because of the draft created as is indicated by arrows 12 to clean the top 6 and the partition 10.

When the cotton is picked up by the saws, the air suction takes it on out through the outlet O to gin the same.

It is thought that the construction, utility and advantages of this invention will now be quite apparent to those skilled in this art without a more detailed description thereof. It is desired, however, to point out that the shaft 22 may be driven by belt 35 and pulley 36 and the auger 32 may be driven by a belt and pulley structure 37 therefrom.

The present embodiment of the invention, however, has been disclosed in detail merely for the purposes of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. A machine of the class described comprising an elongated housing with a partition extending transversely thereacross, a plurality of rotary saws mounted in the housing below the partition, a screen separator cylinder journaled in the housing, a belt of the endless type, means for supporting the belt in an orbit so that the upper run extends below the cylinder and the saws, transverse cleats across the belt, means for moving the belt, a separator above the belt between the cylinder and the saws and inclining downwardly from the cylinders and the saws.

2. A machine of the class described comprising an elongated housing with a partition extending transversely thereacross, a plurality of rotary saws mounted in the housing below the partition, a screen separator cylinder journaled in the housing, a belt of the endless type, means for supporting the belt in an orbit so that the upper run extends below the cylinder and the saws, transverse cleats across the belt, means for moving the belt, a separator above the belt between the cylinder and the saws and inclining downwardly from the cylinder and the saws, a plurality of spaced longitudinally extending cleats formed on the under side of the separator plate, an upwardly spring pressed roller under the upper run of the belt.

3. A machine of the class described comprising an elongated housing with a partition extending transversely thereacross, a plurality of rotary saws mounted in the housing below the partition, a screen separator cylinder journaled in the housing, a belt of the endless type, means for supporting the belt in an orbit so that the upper run extends below the cylinder and the saws, transverse cleats across the belt, means for moving the belt, a separator above the belt between the cylinder and the saws and inclining downwardly from the cylinder and the saws, a plurality of spaced longitudinally extending cleats formed on the under side of the separator plate, an upwardly spring pressed roller under the upper run of the belt, a portion of the bottom of the housing inclining downwardly and forwardly and merging in a transverse cylinder with an entrance, one end of the cylinder being open to form an outlet, and an auger rotatably mounted in the cylinder, means operatively connecting the auger with the means for driving the belt.

4. A machine of the class described comprising an elongated housing with a partition extending transversely thereacross, a plurality of rotary saws mounted in the housing below the partition, a screen separator cylinder journaled in the housing, a belt of the endless type, means for supporting the belt in an orbit so that the upper run extends below the cylinder and the saws, transverse cleats across the belt, means for moving the belt, a separator above the belt between the cylinder and the saws and inclining downwardly from the cylinder and the saws, a plurality of spaced longitudinally extending cleats formed on the under side of the separator plate, an upwardly spring pressed roller under the upper run of the belt, a portion of the bottom of the housing inclining downwardly and forwardly and merging in a transverse cylinder with an entrance, one end of the cylinder being open to form an outlet, and an auger rotatably mounted in the cylinder, means operatively connecting the auger with the means for driving the belt, a damper hingedly mounted on the forward end of the partition.

In testimony whereof we affix our signatures.

HENRY T. AHRENS.
OTTO G. AHRENS.